United States Patent [19]
Larkin

[11] Patent Number: 5,531,072
[45] Date of Patent: Jul. 2, 1996

[54] CONTINUOUSLY VARIABLE HYDROSTATIC TRANSMISSION HAVING SWASHPLATE-MOUNTED CYLINDER BLOCKS

[75] Inventor: Robert F. Larkin, Pittsfield, Mass.

[73] Assignee: Martin Marietta Corporation, King of Prussia, Pa.

[21] Appl. No.: 414,813

[22] Filed: Mar. 31, 1995

[51] Int. Cl.⁶ .................................................. F16D 39/00
[52] U.S. Cl. ............................................... 60/492; 60/491
[58] Field of Search ............................. 60/487, 491, 492, 60/490

[56] References Cited

U.S. PATENT DOCUMENTS

| | | | |
|---|---|---|---|
| 2,788,636 | 4/1957 | Badalini | 60/492 |
| 2,832,198 | 4/1958 | Pichon | 60/492 |
| 3,204,411 | 9/1965 | Stockton | 60/492 |
| 4,493,189 | 1/1985 | Slater | 60/491 X |
| 5,423,183 | 6/1995 | Folsom | 60/491 X |

Primary Examiner—John E. Ryznic
Attorney, Agent, or Firm—Robert A. Cahill; Geoffrey H. Krauss

[57] ABSTRACT

A hydrostatic transmission includes wedge-shaped swashplate operatively positioned between a hydraulic pump unit driven by an input shaft and a grounded hydraulic motor unit to accommodate pumped exchanges of hydraulic fluid between the units. The swashplate, drivingly coupled to an output shaft, is angularly adjustable about a pivot axis oriented in intersecting, orthogonal relation to the output shaft axis to infinitely variable transmission ratios. Pilot bearings, mounted by the swashplate, support cylinder blocks of the hydraulic pump and motor units for nutating motions centered on the swashplate pivot axis to minimize the resultant moment on the swashplate. Piston rods in the hydraulic pump and motor units are oriented in outwardly flared, acute angles to the output shaft axis to expand the range of permissible angular adjustment of the swashplate by a ratio controller.

16 Claims, 1 Drawing Sheet

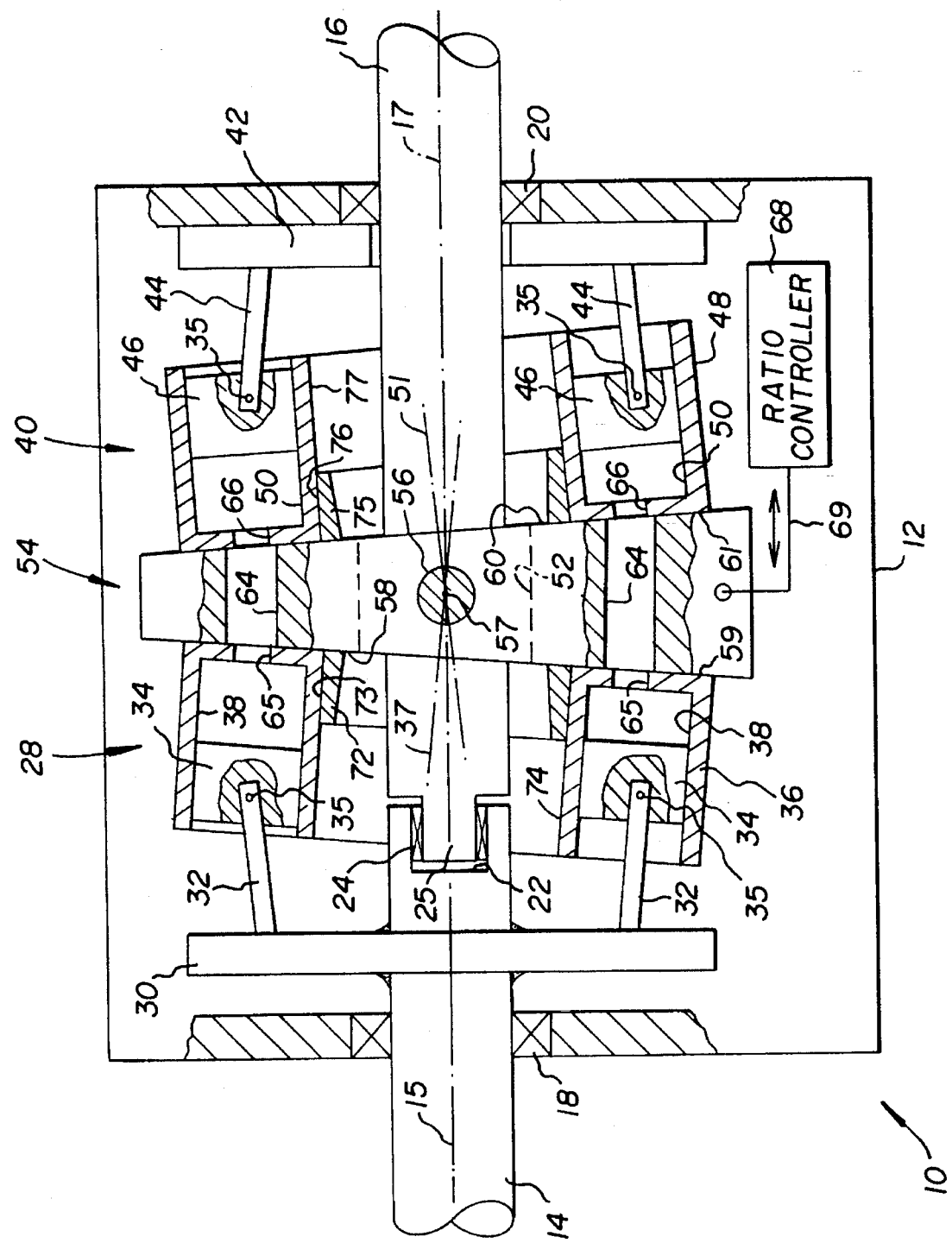

5,531,072

CONTINUOUSLY VARIABLE HYDROSTATIC TRANSMISSION HAVING SWASHPLATE-MOUNTED CYLINDER BLOCKS

REFERENCE TO RELATED APPLICATIONS

The invention disclosed in this application has particular, but not necessary limited, application to continuously variable hydrostatic transmission of the type disclosed in U.S. applications, Ser. No. 08/093,192, now U.S. Pat. No. 5,423,183, filed Jul. 13, 1993; Ser. No. 08/333,688, now U.S. Pat. No. 5,493,862, filed Nov. 3, 1994; Ser. No. 08/342,472, now U.S. Pat. No. 5,486,142 filed Nov. 21, 1994; and 08/380,276, filed Jan. 30, 1995. The disclosures of these applications are incorporated herein by reference.

FIELD OF THE INVENTION

The present invention relates to continuously variable hydrostatic transmissions and particularly to such transmissions utilizing a wedge-shaped swashplate.

BACKGROUND OF THE INVENTION

The continuously variable hydrostatic transmissions disclosed in the cited copending applications include a hydraulic pump unit and a hydraulic motor unit positioned in opposed, axially aligned relation with an intermediate, wedge-shaped swashplate. The pump unit is connected to an input shaft driven by a prime mover, while the motor unit is grounded to the stationary machine housing. An output shaft, coaxial with the input shaft and drivingly coupled to a load, is pivotally connected to the swashplate in torque-coupled relation. When the pump unit is driven by the prime mover, hydraulic fluid is pumped back and forth between the pump and motor units through ports in the swashplate. As a result, three torque components, all acting in the same direction, are exerted on the swashplate to produce output torque on the output shaft for driving the load. Two of these torque components are a mechanical component exerted on the swashplate by the rotating pump unit and a hydromechanical component exerted on the swashplate by the motor unit. The third component is a pure hydrostatic component resulting from the differential forces created by the fluid pressures acting on circumferentially opposed end surfaces of the swashplate ports, which are of different surface areas due to the wedge shape of the swashplate.

To change transmission ratio, the angular orientation of the swashplate relative to the axis of the output shaft is varied by a ratio controller. Since the transmission ratio, i.e., ratio of input shaft speed to output shaft speed, is continuously variable between 1:0 and 1:1, the prime mover can run at a constant speed set essentially at its most efficient operating point. The availability of a 1:0 (neutral) transmission ratio setting eliminates the need for a clutch. As is disclosed in cited application Ser. No. 08/342,472, the swashplate can be positioned to angular orientations beyond the 1:0 ratio setting to provide limited infinitely variable speed drive in a reverse direction, as well as to angular orientations beyond the 1:1 setting to provide a limited, infinitely variable, overdrive speed range. Significantly, reverse drive is available without need for a reversing gear mechanism.

Unlike conventional, continuously variable hydrostatic transmissions, wherein hydraulic fluid flow rate increases proportionately with increasing transmission ratio such that maximum flow rate occurs at the highest transmission ratio setting, the flow rate in the transmissions disclosed in the cited applications reaches a maximum at a midpoint in the ratio range and then progressively decreases to essentially zero at the 1:1 transmission ratio setting. Thus, losses due to hydraulic fluid flow are reduced, and the annoying whine of conventional hydrostatic transmissions at high ratios is avoided. By virtue of the multiple torque components exerted on the swashplate, the decreasing hydraulic fluid flow in the upper half of the output speed range, and the capability of accommodating a prime mover input operating at or near its optimum performance point, the hydraulic machines of the cited U.S. patent applications have a particularly advantageous application as a highly efficient, quiet, continuously variable hydrostatic transmission in vehicular drive trains.

To accommodate operation at the infinitely variable transmission ratios set by the angular orientations of the swashplate, cylinder blocks of the hydraulic pump and motor units, pressed in sliding, interfacial engagement with opposed faces of the swashplate, are mounted by large spherical bearings concentric with the output shaft axis. These spherical bearings permit independent nutating motions of the pump and motor cylinder blocks during transmission operation; the amplitudes of these nutating motions being determined by the inclination angles of the engaging swashplate faces, which, in turn, are determined by the transmission ratio-setting angular orientation of the swashplate. It is the nutating motions of the pump and motor cylinder blocks that produce the hydraulic fluid pumping action of axially fixed pistons received in cylinders of the cylinder blocks. Since these spherical bearings for the pump and motor cylinder blocks are positioned at opposite sides of the swashplate in axially displaced relation to the pivotal connection of the swashplate to the output shaft, the centers of the cylinder block nutating motions and the center of the swashplate ratio-changing pivotal motion are located at three axially displaced points along the output shaft axis.

An important operating requirement is the achievement of a requisite degree of balance of the hydraulic forces exerted by the cylinder blocks and the swashplate on each other, such that the pump and motor cylinder blocks are continuously maintained in substantially fluid tight, interfacial engagement with the swashplate faces. Factors that complicate achievement of this requirement are the axially displaced centers of nutating motions of the pump and motor cylinder blocks noted above and, except for the transmission ratio setting where the inclination angles of the swashplate faces are equal, the force exerted on the swashplate by the cylinder blocks are unequal. Consequently, there is a resultant moment on the swashplate that must be balanced in order to maintain a desired swashplate angular orientation (set a transmission ratio) and that must be overcome in order to change the swashplate angular orientation (stroke the transmission) through a range of transmission ratios (speed range). Unfortunately, the magnitude of this resultant swashplate moment is variable, depending upon hydraulic pressure, swashplate angle (transmission ratio) and various other geometrical conditions, and achieves substantial magnitudes. The ratio controller must therefore exert sufficient force on the swashplate to reliably set a transmission ratio, as well as to change transmission ratio. Consequently, the ratio controller must be particularly forceful and robust and therefore occupy considerable space within the transmission housing.

SUMMARY OF THE INVENTION

It is accordingly an objective of the present invention to provide an improved continuously variable hydrostatic transmission of the type disclosed in the cited U.S. applications.

A further objective of the present invention is to provide an improved hydrostatic transmission of the above character, wherein the problems posed by hydraulic balance considerations are largely alleviated.

An additional objective of the present invention is to provide an improved hydrostatic transmission of the above character, wherein the force requirements for setting and changing transmission ratio are greatly relaxed.

The present invention achieves these objectives by providing a continuously variable hydrostatic transmission that comprises an input shaft for receiving input torque from a prime mover and having a first axis, an output shaft for imparting output torque to a load and having a second axis, and a housing journaling the input shaft for rotation about the first axis and an output shaft for rotation about the second axis. A hydraulic pump unit is coupled for rotation by the input shaft about the first axis and includes a plurality of pump pistons that respectively operate in a plurality of pump cylinders that are in respective fluid communication with openings in a face of a first member. A hydraulic motor unit, fixed against rotation by the housing, includes a plurality of motor pistons respectively operating in a plurality of motor cylinders in respective fluid communication with the openings in a face of a second member. An annular swashplate is drivingly connected to the output shaft and is pivotable about a pivot axis intersecting the second axis in orthogonal relation. The swashplate includes an input face in sliding, interfacial engagement with the first member face, an output face, axially opposed to the input face and arranged at an acute angle to the input face, in sliding, interfacial engagement with the second member face, and a plurality of ports extending between the input and output faces to accommodate pumped exchanges of hydraulic fluid between the hydraulic pump and motor unit cylinders. A ratio controller is linked to the swashplate to forcibly hold the swashplate at a transmission ratio-setting angular orientation and also to change transmission ratio by pivoting the swashplate about its pivot axis.

In accordance with a signal feature of the present invention, bearing means are provided to support separate nutating motions of the first and second members during transmission operation that are consistently centered on the pivot axis of the swashplate. By virtue of this bearing support for the first and second members, forces exerted by the first and second members on the swashplate are essentially balanced at all transmission ratio settings. Consequently, the forces that the ratio controller must exert on the swashplate to set a transmission ratio and to change transmission ratio are minimized.

Additional features, advantages, and objectives of the invention will be set forth in the description which follows and in part will be apparent from the description, or may be learned by practice of the invention. The objectives and advantages of the present invention will be realized and attained by the apparatus and method particularly pointed out in the following written description and the appended claims, as well as in the accompanying drawing.

It will be understood that both the foregoing general description and the following detailed description are exemplary and explanatory and are intended to provide further explanation of the invention as claimed.

The accompanying drawing is intended to provide a further understanding of the invention and is incorporated in and constitutes a part of the specification, illustrates a preferred embodiment of the invention and, together with the description, serves to explain the principles of the invention.

BRIEF DESCRIPTION OF THE DRAWINGS

The sole figure of the drawings is a longitudinal cross-sectional view, partially in schematic form, of a continuously variable hydrostatic transmission structured in accordance with a preferred embodiment of the present invention.

DETAILED DESCRIPTION OF THE PREFERRED EMBODIMENT

Referring to the sole figure of the drawing, a continuously variable hydrostatic transmission, structured in accordance with a preferred embodiment of the present invention and generally indicated at 10, comprises a housing 12 into which an input shaft 14 and an output shaft 16 extend. The input shaft receives input torque from a prime mover (not shown), and the output shaft imparts output torque to a load (not shown). A housing input end-wall or cover incorporates bearings 18 journaling the input shaft 14 for rotation about its axis 15, while a output endwall or cover incorporates bearings 20 journaling the output shaft 16 for rotation about its axis 17. The inner termination of the input shaft is machined to provide a cylindrical recess 22 in which a roller bearing 24 is fitted to journal a turned down inner termination 25 of the output shaft 16. Thus, the input shaft axis 15 and the output shaft axis 17 are coaxial.

A hydraulic pump unit, generally indicated at 28, includes a carrier 30 drivingly connected to the input shaft 14. A plurality of piston rods 32, which may be in the form of elongated bolts as described in the cited U.S. applications, are affixed at corresponding one ends to carrier 30 at uniformly distributed positions around a circle concentric with input shaft axis 15. The free end of each piston rod 32 mounts a pump piston 34 via a joint, schematically indicated at 35, that permits limited swivelling and radial motions of the pump piston. Suitable piston mounting joints 35 are disclosed in the cited U.S. applications. Hydraulic pump unit 28 also includes an annular pump cylinder block 36 that surrounds output shaft 16. This cylinder block is formed to provide a circle array of pump cylinders 38 in which the pump pistons 34 are respectively, slidingly received. Since carrier 30 is driven by input shaft 14, pump cylinder block 36 rotates in unison with the input shaft. The number of pump piston-cylinder sets in the circle array may be ten, for example.

A hydraulic motor unit, generally indicated at 40, includes a carrier 42 that is grounded to housing 12. Otherwise the hydraulic motor unit is structurally equivalent to hydraulic pump unit 28. Thus, a circle array of piston rods 44, concentric with the output shaft axis 17, are affixed at corresponding one ends to carrier 42 serve to swivel mount motor pistons 46 via joints 35 at their free ends. An annular motor cylinder block 48 surrounds output shaft 16 and is formed with motor cylinders 50 that slidingly receive the motor pistons 46. Since carrier 42 is ground to the housing, motor cylinder block 48 is constrained against rotational motion. The number of motor piston-cylinder sets is preferably also ten, and their circle array corresponds to the circle array of the pump piston-cylinder sets, such that the two circle arrays are in essentially axial opposed relation.

Output shaft 16 extends through a central opening 52 of a wedge-shaped swashplate, generally indicated at 54, that is operatively positioned between pump cylinder block 36 and motor cylinder block 48. The swashplate is pivotally connected in torque coupled relation to output shaft 16 by a pin 56, such that the swashplate, while rotating with the output shaft, can be pivoted about the axis 57 of pin 56 that is orthogonal to and intersecting with output shaft axis 17. The swashplate 54 includes an input (left) face 58 in sliding interfacial engagement with a face 59 of pump cylinder block 36 and an output (right) face 60 in sliding interfacial engagement with a face 61 of motor cylinder block 48. The swashplate faces 58 and 60 are relatively oriented at an acute angle to create the wedge shape of the swashplate. Axial ports 64, extending between the input 58 and output 60 faces of the swashplate, provide communication between the pump cylinders 38 and the motor cylinders 50 through openings 65 in the pump cylinder block face 59 and openings 66 in the motor cylinder block face 61, such as to accommodate pumped exchanges of hydraulic fluid between the hydraulic pump 28 and motor 40 units. As noted above, hydraulic forces maintain the cylinder block faces in essentially fluid-sealed engagement with the swashplate faces during these pumped exchanges of hydraulic fluid.

A ratio controller, diagrammatically illustrated at 68, is linked, is indicated at 69, to swashplate 50 to pivot the swashplate about the pivot axis 57 and thus change its angular orientation relative to the output shaft axis 17. As described in the cited U.S. applications, changing the swashplate orientation changes the transmission ratio of input to output shaft speed. For example, when the angular orientation of the swashplate, sustained by ratio controller 68, is such that its input face 58 is orthogonal to the output shaft axis, a neutral (1:0) transmission ratio is set. When the ratio controller pivots the swashplate to orient its output face 60 orthogonal to the output shaft axis, a 1:1 transmission ratio is set. Between the 1:0 and 1:1 ratio settings, the ratio controller can set an infinite number of ratio settings. The ratio setting illustrated in the drawing figure is 1:0.5, since the inclination angles of the swashplate input and output faces relative to the output shaft axis 17 are equal.

In accordance with a signal feature of the present invention, the pump cylinder block 36 and the motor cylinder block 48 are supported such that they always pivot about the same point, e.g., pivot axis 57, as swashplate 54 during ratio changes, as well as during the nutating (hydraulic fluid pumping) motions of the cylinder blocks imposed by the nutating motion of the swashplate as it rotates about the output shaft axis. Reference numeral 37 represents the axis of symmetry of pump cylinder block 36, while reference numeral 51 represents the axis of symmetry of motor cylinder block 48. It is seen that axis 37 is precessed at an angle relative to the output shaft axis 17 that is dictated by the inclination angle of swashplate input face 58 at each ratio setting, and axis 51 is precessed at an angle relative to the output shaft axis that is dictated by the inclination angle of the swashplate output face 60 at each ratio setting. As can be appreciated from the drawing, as the cylinder blocks undergo nutating motions, their axes of symmetry 37 and 51 are consistently in intersection with the swashplate pivot axis 57.

In accordance with the preferred embodiment of the invention illustrated in the drawings, pump cylinder block 36 is supported by an annular pilot bearing 72 affixed to the swashplate 54 to provided an annular bearing surface 73 in sliding engagement with a cylinder bearing surface 74 defining the central opening in the annular pump cylinder block. In the same manner, motor cylinder block 48 is supported by an annular pilot bearing 75 having an annular bearing surface 76 in sliding engagement with a cylindrical bearing surface 77 defining the central opening in the annular motor cylinder block. Preferably, pilot bearing surfaces 73 and 76 are respectively oriented in orthogonal relation to the swashplate input 58 and output 60 faces.

It is seen that bearings 72 and 75 individually support the pump and motor cylinder blocks such that their nutating and ratio change motions are always centered on the swashplate pivot axis, while permitting sliding interfacial movements as the swashplate rotates relative to the cylinder blocks about the output shaft axis.

By virtue of the bearing support provided by pilot bearings 72 and 75, the resultant of the hydraulic balance forces exerted by cylinder blocks on the swashplate to maintain the requisite interfacial, sliding engagements is vectored essentially through the swashplate pivot axis 57. Consequently, there is virtually no resultant moment exerted on the swashplate by the cylinder blocks that must be overcome by ratio controller 68 in order to set a transmission ratio and to change transmission ratio. If any resultant moment on the swashplate does exist, it would vary linearly with ratio change, rather than exponentially as in the case, illustrated in the cited U.S. applications, where the cylinder blocks are supported by separate spherical bearings concentric with the output shaft axis and thus create centers of nutating motions that are axially displaced along the output shaft axis from the swashplate pivot axis. Moreover, since pilot bearings 72 and 75 eliminate relative radial motions at the cylinder block-swashplate interfaces, hydrostatic shear is reduced, and the character of the engaging faces of the cylinder blocks and the swashplate and the locations of the swashplate ports 64 and the cylinder block openings 65, 66 can be optimized°

Another feature of the present invention illustrated in the drawing is the orientations of the pump piston rods 32 and the motor piston rods 44 at corresponding acute angles flared away from the coaxial shaft axes, rather than parallel to the shaft axes as disclosed in the cited U.S. applications. This feature allows the swashplate to be pivoted through a wider range of reverse transmission ratios in the counterclockwise direction beyond the neutral setting (swashplate input face 58 orthogonal to the output shaft axis 17) and through a wider range of overdrive transmission ratios in the clockwise direction beyond the 1:1 ratio setting (swashplate output face 60 orthogonal to the output shaft axis).

While the objectives of the present invention are achieved in the illustrated preferred embodiment by mounting the pump and motor cylinder blocks to the swashplate, it will be appreciated that the cylinder blocks may be supported by a single or a pair of spherical bearings mounted concentric with the output shaft axis and axially positioned to center the nutation motions of the cylinder blocks on the swashplate pivot axis. It will also be appreciated that the pilot bearings 72 and 75 may instead be affixed to the cylinder blocks and slidingly engage an annular bearing surface provided by the central opening 52 of the swashplate, for example. Furthermore, the pilot bearings 72 and 75 may be axial extensions of a single bearing member fixed in the central opening 52 of the swashplate. Moreover, the objectives of the present invention may be achieved when portplates, rather than cylinder blocks are utilized to communicate the pumped flow of hydraulic fluid between the pump and motor cylinders and the swashplate ports, as in the transmission embodiments disclosed in the above-cited U.S. application Ser. Nos. 08/093,192 and 08/380,276. In this case, the portplates would be supported in the same manner as the cylinder blocks to center the nutating motions of the portplates on the swashplate pivot axis.

It will be apparent to those skilled in the art that various modifications and variations can be made to the apparatus of the present invention without departing from the spirit of the invention. Thus, it is intended that the present invention be construed to cover modifications and variations thereof, provided they come within the spirit and scope of the appended claims and their equivalents.

What is claimed is:

1. A continuously variable hydrostatic transmission comprising:
    an input shaft for receiving input torque from a prime mover and having a first axis;
    an output shaft for imparting output torque to a load and having a second axis;
    a housing journaling the input shaft for rotation about the first axis and the output shaft for rotation about the second axis;
    a hydraulic pump unit coupled for rotation by the input shaft about the first axis, the hydraulic pump unit including a plurality of pump pistons respectively in a plurality of pump cylinders in respective fluid communication with openings in a face of a first member;
    a hydraulic motor unit fixed against rotation by the housing, the hydraulic motor unit including a plurality of motor pistons respectively operating in a plurality of motor cylinders in respective fluid communication with openings in a face of a second member;
    an annular swashplate drivingly connected to the output shaft on a pivot axis intersecting the second axis in orthogonal relation, the swashplate including:
        an input face in sliding interfacial engagement with the first member face,
        an output face in axially opposed relation to the input face and arranged at an acute angle to the input face, the output face in sliding, interfacial engagement with the second member face, and
        a plurality of ports extending between the input and output faces to accommodate pumped exchanges of hydraulic fluid between the hydraulic pump and motor unit cylinders;
    bearing means supporting the first and second members for nutating motions centered on the pivot axis at all transmission ratios; and
    a ratio controller linked to the swashplate for producing transmission ratio-changing pivotal motion of the swashplate about the pivot axis.

2. The continuously variable hydrostatic transmission defined in claim 1, wherein the bearing means is mounted by the swashplate.

3. The continuously variable hydrostatic transmission defined in claim 1, wherein the first and second axes are coaxial.

4. The continuously variable hydrostatic transmission defined in claim 2, wherein the first member is a pump cylinder block having the plurality of pump cylinders formed therein, the pump cylinder block including a first annular bearing surface in sliding engagement with the bearing means, and the second member is a motor cylinder block having the plurality of motor cylinders formed therein, the motor cylinder block including a second annular bearing surface in sliding engagement with the bearing means.

5. The continuously variable hydrostatic transmission defined in claim 4, wherein the pump unit further includes a first carrier coupled for rotation by the input shaft and a plurality of pump piston rods having first ends fixed to the first carrier and second ends respectively swivel-connected to the pump pistons, and wherein the motor unit further includes a second carrier fixed to housing and a plurality of motor piston rods having first ends fixed to the second carrier and second ends respectively swivel-connected to the motor pistons.

6. The continuously variable hydrostatic transmission defined in claim 5, wherein the pump piston rods are oriented at a corresponding acute angled flared outwardly relative to the first axis, the motor piston rods are oriented at corresponding acute angles flared outwardly relative to the second axis.

7. The continuously variable hydrostatic transmission defined in claim 4, wherein the bearing means includes a first pilot bearing mounted by the swashplate to provide a third annular bearing surface engaging the first annular bearing surface and a second pilot bearing mounted by the swashplate to provide a fourth annular bearing surface engaging the second annular bearing surface.

8. The continuously variable hydrostatic transmission defined in claim 7, wherein the first annular bearing surface is provided by a central opening in the pump cylinder block, and the second annular bearing surface is provided by a central opening in the motor cylinder block.

9. The continuously variable hydrostatic transmission defined in claim 8, wherein the first and second axes are coaxial.

10. The continuously variable hydrostatic transmission defined in claim 3, wherein the bearing means includes a first annular pilot bearing mounted by one of the swashplate and the first member and a second annular pilot bearing mounted by one of the swashplate and the second member.

11. The continuously variable hydrostatic transmission defined in claim 10, wherein the first member is an annular pump cylinder block having the plurality of pump cylinders formed therein, and the second member is an annular motor cylinder block having the plurality of motor cylinders formed therein.

12. A continuously variable hydrostatic transmission comprising:
    an input shaft for receiving input torque from a prime mover and having a first axis;
    an output shaft for imparting output torque to a load and having a second axis;
    a housing journaling the input shaft for rotation about the first axis and the output shaft for rotation about the second axis;
    a hydraulic pump unit including:
        a first carrier coupled for rotation by the input shaft,
        a plurality of first connecting rods having one ends affixed to the first carrier in a circle array concentric with the first axis and free ends, the first connecting rods oriented at corresponding, outwardly flared, acute angles relative to the first axis,
    a plurality of pump pistons respectively swivel-connected to the free ends of the first connecting rods,
        a pump cylinder block providing a plurality of pump cylinders for respectively slidingly receiving the pump pistons, the pump cylinder block having a face with openings into the pump cylinders, and
        a first bearing mounting the pump cylinder block for rotating and nutating motions;
    a hydraulic motor unit including:
        a second carrier grounded to the housing,
        a plurality of second connecting rods having one ends affixed to the second carrier in a circle array concentric with the second axis and free ends, the second connecting rods oriented at corresponding, outwardly flared, acute angles relative to the second axis, a plurality of motor pistons respectively swivel-connected to the free ends of the second connecting rods, a motor cylinder block providing a plurality of motor cylinders for respectively slidingly receiving the motor pistons, the motor cylinder blocks having a face with openings into the motor cylinders, and a second bearing mounting the motor cylinder block for nutating motion;

an annular swashplate drivingly connected to the output shaft on a pivot axis intersecting the second axis in orthogonal relation, the swashplate including:
  an input face in sliding, interfacial engagement with the pump cylinder block face,
  an output face in axially opposed relation to the input face and arranged at an acute angle to the input face, the output face in sliding, interfacial engagement with the motor cylinder block face, and
  a plurality of ports extending between the input and output faces to accommodate pumped exchanges of hydraulic fluid between the pump and motor cylinders; and a ratio controller linked to the swashplate for producing transmission ratio-changing pivotal motion of the swashplate about the pivot axis.

13. A continuously variable hydrostatic transmission comprising:

an input shaft for receiving input torque from a prime mover and having a first axis;

an output shaft for imparting output torque to a load and having a second axis;

a housing journaling the input shaft for rotation about the first axis and the output shaft for rotation about the second axis;

a hydraulic pump unit coupled for rotation by the input shaft about the first axis, the hydraulic motor unit including a plurality of pump pistons respectively operating in a plurality of pump cylinders in respective fluid communication with openings in a face of a first member having an axis;

a hydraulic motor unit fixed against rotation by the housing, the hydraulic motor unit including a plurality of motor pistons respectively operating in a plurality of motor cylinders in respective fluid communication with openings in a face of a second member having an axis;

an annular swashplate drivingly connected to the output shaft on a pivot axis intersecting the second axis in orthogonal relation, the swashplate including:
  an input face in interfacial engagement with the first member face,
  an output face axially opposite to the input face and arranged at an acute angle to the input face, the output face in interfacial engagement with the second member face, and
  a plurality of ports extending between the input and output faces to accommodate pumped exchanges of hydraulic fluid between the pump and motor cylinders;

bearing means for supporting separate nutating motions of the first and second members, such that the axes of the first and second members consistently intersect the pivot axis; and a ratio controller linked to the swashplate for producing transmission ratio-changing pivotal motion of the swashplate about the pivot axis.

14. The continuously variable hydrostatic transmission defined in claim 13, wherein the first member is an annular pump cylinder block having the plurality of pump cylinders formed therein, and the second member is an annular motor cylinder block having the plurality of motor cylinders formed therein.

15. The continuously variable hydrostatic transmission defined in claim 14, wherein the first and second axes are coaxial.

16. The continuously variable hydrostatic transmission defined in claim 15, wherein the bearing means includes a first annular pilot bearing mounted by one of the swashplate and the first member and a second annular pilot bearing mounted by one of the swashplate and the second member.

* * * * *